United States Patent [19]
Chiu

[11] Patent Number: 5,110,263
[45] Date of Patent: May 5, 1992

[54] CONVERTIBLE FLOOR AND WINDOW FAN

[75] Inventor: Bernard Chiu, Ashland, Mass.

[73] Assignee: Duracraft Corporation, Sudbury, Mass.

[21] Appl. No.: 587,291

[22] Filed: Sep. 24, 1990

[51] Int. Cl.⁵ .............................. F04D 29/64
[52] U.S. Cl. ...................... 416/244 R; 417/423.14; 416/63
[58] Field of Search .............. 416/244 R, 247 R, 63, 416/246; 417/423.14, 423.7, 423.15; 428/677, 188.8, 167, 231.4

[56] References Cited

U.S. PATENT DOCUMENTS

| | | | |
|---|---|---|---|
| 2,620,127 | 12/1952 | Radcliffe | 416/244 |
| 2,622,793 | 12/1953 | Ganger et al. | 416/244 |
| 2,634,906 | 4/1953 | Heiman | 416/247 |
| 2,857,095 | 10/1958 | Grau | 416/247 |
| 2,961,152 | 11/1960 | Douglas et al. | 417/234 |
| 3,029,870 | 4/1962 | Heller | 416/244 |
| 4,341,151 | 7/1982 | Sakamoto | 416/247 R |

Primary Examiner—Edward K. Look
Assistant Examiner—Michael S. Lee
Attorney, Agent, or Firm—John E. Toupal; Harold G. Jarcho

[57] ABSTRACT

A portable electric fan including a housing having a front wall defining a front opening for transmitting air, a rear wall defining a rear opening for transmitting air, a top surface, and a bottom surface; a fan blade rotatably mounted in the housing and adapted to move air in a given direction through the front and rear openings; and retainer means projecting upwardly from the top surface and adapted to engage one side of the sash of a vertically movable window. Also included are first and second elongated legs movably mounted in spaced apart positions on the bottom surface and adapted for movement between floor and window positions, each of the legs projecting in the given direction beyond the front and rear walls when in its floor position and extending in longitudinally aligned directions substantially perpendicular to the direction when in its window position. The retainer means and elongated legs facilitate alternative use of the fan for either internal or window applications.

30 Claims, 2 Drawing Sheets

CONVERTIBLE FLOOR AND WINDOW FAN

BACKGROUND OF THE INVENTION

This invention relates generally to a portable electric fan and, more particularly, to a portable electric fan for selective use as either a window fan or a free standing fan suitable for placement on stable support surfaces such as floors or tables.

Portable electric fans are used extensively to reduce personal discomfort caused by excessive temperature. Most users maximize utility of such fans by moving them into different locations determined by particular activities. For example, fans can be placed on available support surfaces such as floors or tables to provide air movement within housing enclosures or can be mounted in open windows to provide air circulation between a housing enclosure and the external environment. Most prior portable fans, however, have not been structurally suitable for safe and efficient use when mounted in open windows.

The object of this invention, therefore, is to provide an improved portable electric fan that can be conveniently and safely used in either desired internal locations of a housing structure or in open windows thereof.

SUMMARY OF THE INVENTION

The invention is a portable electric fan including a housing having a front wall defining a front opening for transmitting air, a rear wall defining a rear opening for transmitting air, a top surface, and a bottom surface; a fan blade rotatably mounted in the housing and adapted to move air in a given direction through the front and rear openings; and retainer means projecting upwardly from the top surface and adapted to engage one side of the sash of a vertically movable window. Also included are first and second elongated legs movably mounted in spaced apart positions on the bottom surface and adapted for movement between floor and window positions, each of the legs projecting in the given direction beyond the front and rear walls when in its floor position and extending in longitudinally aligned directions substantially perpendicular to the direction when in its window position. The retainer means and elongated legs facilitate alternative use of the fan for either internal or window applications.

According to one feature of the invention, the retainer means comprise tabs molded integrally with the housing and disposed at an edge of the top surface joining the rear wall. The efficient and low cost tabs render the fan useful as an air exhaust unit.

According to another feature, the invention includes another pair of spaced apart tabs disposed at an edge of the top surface joining the front wall. The second pair of tabs permits alternative use of the fan as an intake unit.

According to yet another feature of the invention, the retainer means further comprises a handle mounted for movement in the given direction on a central portion of the top surface and projecting upwardly therefrom. After positional adjustment to engage an opposite side of the sash, the handle provides further stability for the window mounted fan unit.

According to still another feature, the invention includes means biasing movement of the handle toward the rear edge mounted tabs. The bias means simplifies positional adjustment of the handle.

According to a further feature, the invention includes electrical controls movably mounted on the housing and adapted for movement between one position accessible by a user facing the front wall and another position accessible by a user facing the rear wall. The movable controls facilitate alternative use of the fan as either an intake or exhaust unit.

DESCRIPTION OF THE DRAWINGS

These and other objects and features of the invention will become more apparent upon a perusal of the following description taken in conjunction with the accompanying drawings wherein.

DESCRIPTION OF THE PREFERRED EMBODIMENTS

Figure 1:
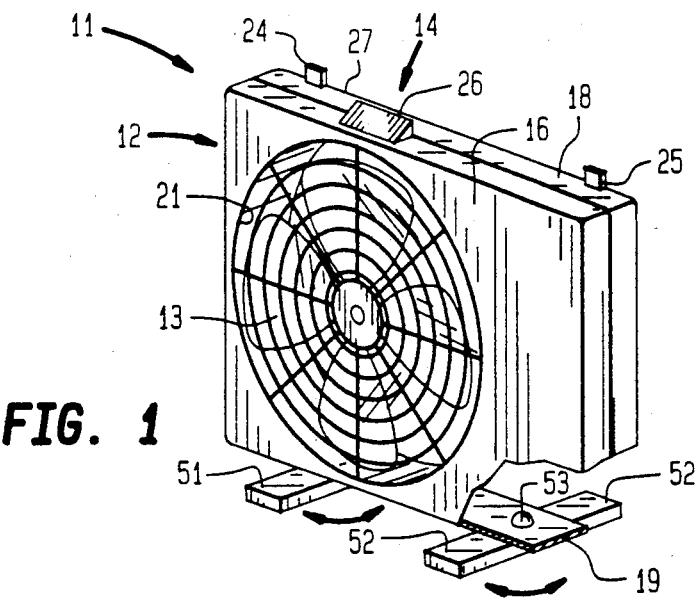
FIG. 1 is a front perspective view of a convertible fan according to the invention.
Figure 2:
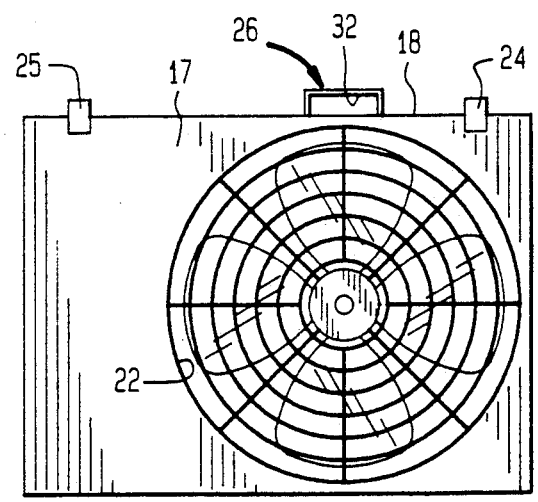
FIG. 2 is a rear view of the fan shown in FIG. 1.

A convertible fan 11 includes a housing 12 and a fan blade 13 rotatably mounted in the housing 12. The housing 12 has a front wall 16 and a rear wall 17 joined by a top surface 18, a bottom surface 19 and a retainer system 14. Defined by the front surface 16 is a front opening 21 while the rear wall 17 defines a rear opening 22. The front and rear openings 21, 22 transmit air moved by the blade 13 in a direction perpendicular to the front and rear walls 16, 17.

Figure 3:
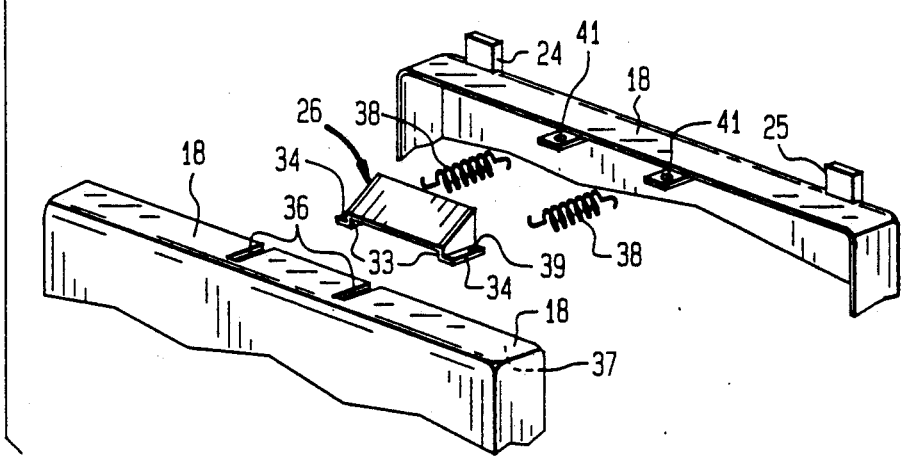
FIG. 3 is an exploded view of a handle assembly.
Figure 4:
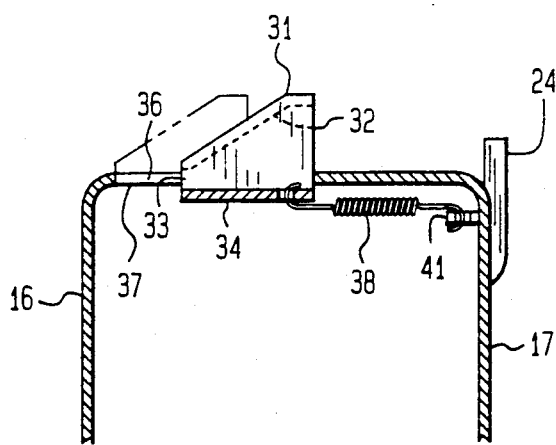
FIG. 4 is a partial cross sectional view of the handle assembly shown in FIG. 3.

Included in the retainer system 14 are a pair of tabs 24, 25 and a handle 26 all projecting upwardly from the top surface 18. The tabs 24, 25 are molded integrally with the housing 12 and are spaced apart on an edge 27 of the top surface 18 that joins the rear wall 17. As shown in FIGS. 3 and 4, the handle 26 includes a hood portion 31 the underside 32 of which forms a gripping surface, downwardly extending leg portions 33, and flange portions 34 extending outwardly therefrom. The legs 33 extend through slots 36 in a front portion of the top surface 18 and the flange portions 34 slidably engage an under surface 37 thereof. A pair of spring members 38 have opposite ends attached, respectively, to apertures 39 in the flange portions 34 and apertures in tabs 41 extending from an inner surface of the rear wall 17. Thus, the centrally located handle 26 is mounted for sliding movement on the top surface 18 in the given direction of air flow through the front and rear openings 21, 22 and is biased rearwardly toward the tabs 24, 25 by the spring members 38.

Figure 5:
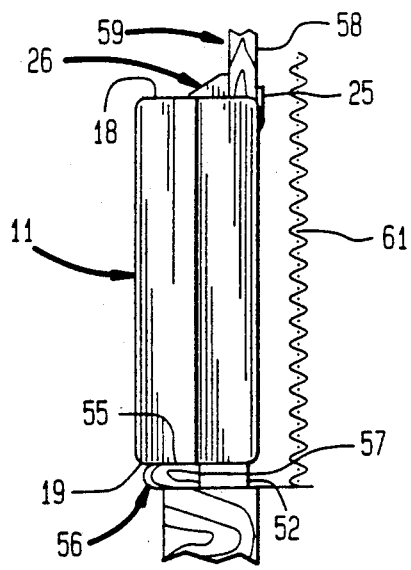
FIG. 5 is a cross-sectional view showing the convertible fan of FIG. 1 mounted in an open window.

Supporting the housing 12 are a pair of elongated legs 51, 52. Each of the legs 51, 52 is pivotally secured by pivots 53 to the bottom surface 19. The legs 52 can be pivotally moved from a floor position shown in FIG. 1 in which they project beyond the front and rear walls 16, 17 in the given direction of air flow through the openings 21, 22 and a window position shown in FIG. 5 in which they are longitudinally aligned in directions substantially perpendicular to the given direction of air flow.

During use of the fan 11, the gripping portion 32 of the handle 26 can be used to transport the housing 12 to any desired location providing a suitable support surface (not shown) for the legs 51, 52 in their floor positions shown in FIG. 1. When use in an open window is desired, the fan 11 is mounted in the manner shown in FIG. 5. After pivoting of the legs 51, 52 into their aligned window positions, the bottom surface 19 is placed on the upper surface 55 of a window sill molding 56. The legs 51, 52 extend behind and below the molding 56 and engage a rear surface 57 thereof. With the fan 11 in that position, the tabs 24, 25 are aligned with a rear surface 58 of an opened sash 59 which then is lowered into engagement with the top surface 18 while the handle is held forwardly against the bias of the spring members 38. After closing of the sash 59 against the upper surface 18, the handle 26 is released allowing the spring members 38 to move the hood portion 31 into engagement with an inner surface of the sash 59. Thus, the fan 11 is securely retained between the sash 59 and the sill 56 while the rearwardly positioned tabs 24, 25 provide a positioning stop that establishes clearance for a window screen 61.

Figure 6:
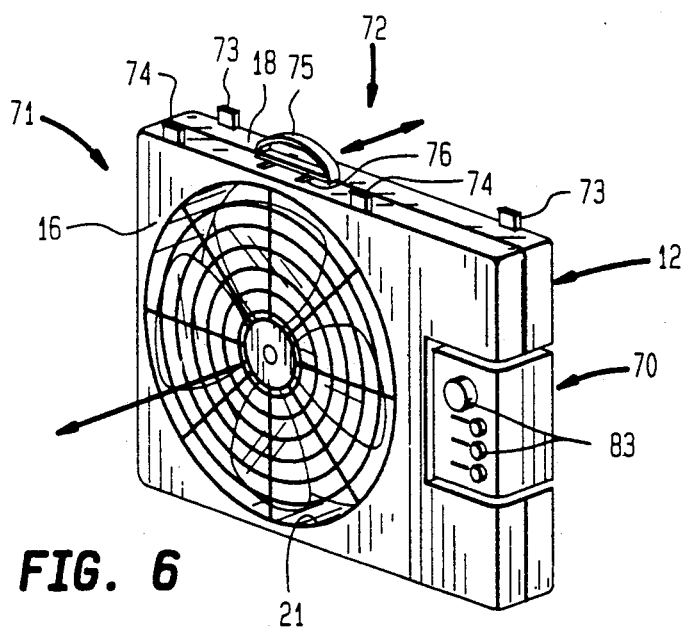
FIG. 6 is a front perspective view of another convertible fan embodiment.
Figure 7:
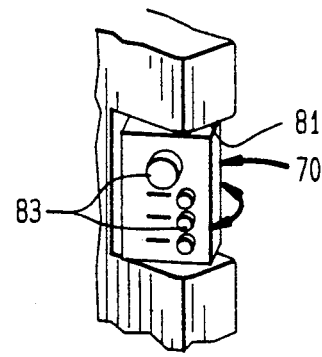
FIG. 7 is a detailed view of a rotatable electrical control unit included with the fan shown in FIG. 6.
Figure 8:
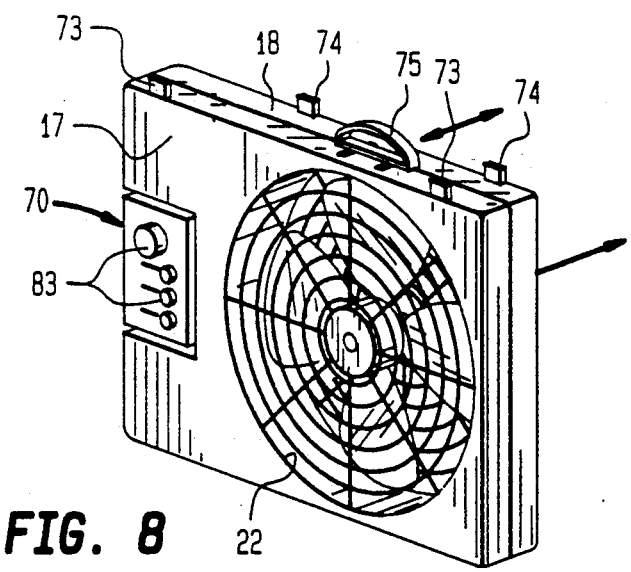
FIG. 8 is a rear perspective view of the fan shown in FIG. 6.

Illustrated in FIGS. 6-8 is another convertible fan embodiment 71 of the invention. Parts of the fan embodiment 71 identical to those of above described embodiment 11 have been given the same reference numerals. The fan 71 is adapted for use as either an intake or an exhaust unit by a retainer system 72 and an electrical control box 70. Included in the retainer system 72 are a pair of rear tabs 73, a pair of front tabs 74, and a handle 75. The rear tabs 73 extend upwardly from the top surface 18 and are spaced apart along a rear edge thereof joining the rear surface 17. Similarly, the front tabs 74 extend upwardly from the top surface 18 and are spaced apart along a front edge thereof joining the front surface 16. Preferably, the tabs 73, 74 are molded as an integral unit with the housing 12. The handle 75 is mounted for sliding movement within slots 76 in the top surface 18 in the given direction of air flow through the openings 21, 22.

As shown in FIG. 7, the electrical control unit 70 is rotatably mounted in a recess 81 formed in the housing 12. Thus, the control box 70 can be rotated between a front position shown in FIG. 6 and a rear position shown in FIG. 8. When in its front position shown in FIG. 6, control buttons 83 of the unit 73 are accessible by a user facing the front wall 16. Conversely, when in their rear position, the control buttons 83 are accessible to a user facing the rear wall 17.

When used as a window fan, the unit 71 is positioned in an opened window in a manner similar to that described above. When use as an intake fan is desired, the housing 12 is placed on a window sill and a sash is lowered into engagement with the top surface 18 and between the rear tabs 73 and the handle. Secure retention is insured by moving the handle 75 into engagement with an inner surface of the sash and the box 70 is rotated into its forward position shown in FIG. 6 so as to be accessible to a user in an enclosure defining the open window into which the fan unit 71 has been placed.

When use as an exhaust fan is desired, the unit 71 is positioned on a sill and a window sash is moved downwardly into engagement with the top surface 18 and between the front tabs 74 and the handle 75. Again, the handle 75 is adjusted along the top surface 18 to establish engagement of a sash between the front tabs 74 and the handle 75. Finally, the control box 70 is rotated into its rear facing position shown in FIG. 8 again establishing access of the control buttons 83 to a user within the enclosure defining the open window into which the fan unit 71 has been placed.

Obviously, many modifications and variations of the present invention are possible in light of the above teachings. It is to be understood, therefore, that the invention can be practiced otherwise than as specifically described.

What is claimed is:

1. A portable electric fan comprising:
    housing means having a front wall defining a front opening for transmitting air, a rear wall defining a rear opening for transmitting air, a top surface, and a bottom surface;
    fan blade means rotatably mounted in said housing means and adapted to move air in a given direction through said front and rear openings;
    retainer means projecting upwardly from said top surface and adapted to engage one side of the sash of a vertically movable window; and
    first and second elongated legs movably mounted in spaced apart positions on said bottom surface and adapted for movement between floor and window positions, each of said legs projecting in said given direction beyond said front and rear walls when in said floor position and extending in longitudinally aligned directions substantially perpendicular to said direction when in said window position.

2. A fan according to claim 1 wherein said retainer means comprise tab means molded integrally with said housing means.

3. A fan according to claim 2 wherein said tab means comprise a pair of spaced apart tabs disposed at an edge of said top surface joining said rear wall.

4. A fan according to claim 1 wherein said retainer means comprise a pair of spaced apart tabs disposed at an edge of said top surface joining said front wall.

5. A fan according to claim 4 wherein said retainer means further comprises a handle means mounted on a central portion of said top surface and projecting upwardly therefrom, and adapted to engage an opposite side of the sash.

6. A fan according to claim 5 wherein said handle means is mounted for movement in said given direction on said top surface.

7. A fan according to claim 3 wherein said retainer means further comprises a handle means mounted on a central portion of said top surface and projecting upwardly therefrom, and adapted to engage an opposite side of the sash.

8. A fan according to claim 7 wherein said handle means is mounted for movement in said given direction on said top surface.

9. A fan according to claim 8 including bias means biasing movement of said handle means toward said tabs.

10. A fan according to claim 1 including electrical control means movably mounted on said housing means and adapted for movement between one position accessible by a user facing said front wall and another position accessible by a user facing said rear wall.

11. A portable electric fan comprising:
    housing means having a front wall defining a front opening for transmitting air, a rear wall defining a rear opening for transmitting air, a top surface, and a bottom surface;

fan blade means rotatably mounted in said housing means and adapted to move air in a given direction through said front and rear openings; and electrical control means movably mounted on said housing means and adapted for movement between one position accessible by a user facing said front wall and another position accessible by a user facing said rear wall.

12. A fan according to claim 11 wherein said electrical control means comprises a control unit rotatably mounted on said housing means.

13. A fan according to claim 11 including retainer means projecting upwardly from said top surface and adapted to engage one side of the sash of a vertically movable window; said retainer means comprising a first pair of spaced apart tabs disposed at an edge of said top surface joining said rear wall, and a second pair of spaced apart tabs disposed at an edge of said top surface joining said front wall.

14. A portable electric fan comprising:

housing means having a front wall defining a front opening for transmitting air, a rear wall defining a rear opening for transmitting air, a top surface, and a bottom surface;

fan blade means rotatably mounted in said housing means and adapted to move air in a given direction through said front and rear openings; and first retainer means projecting upwardly from said top surface and adapted to engage one side of a sash of a vertically movable window; and second retainer means projecting upwardly from said top surface and spaced from said first retainer means in said given direction, said second retainer means adapted to engage a side of the sash opposite to the one side thereof.

15. A fan according to claim 14 wherein said second retainer means is mounted for movement on said top surface in said given direction.

16. A fan according to claim 15 including bias means biasing movement of said second retainer means toward said first retainer means.

17. A fan according to claim 16 wherein said first retainer means comprises a pair of tabs spaced apart in a direction transverse to said given direction.

18. A fan according to claim 17 wherein said tabs are molded integrally with said housing means.

19. A fan according to claim 18 wherein said tabs are disposed at an edge of said top surface joining said rear wall.

20. A fan according to claim 14 wherein said first retainer means comprises a pair of tabs spaced apart in a direction transverse to said given direction.

21. A fan according to claim 20 wherein said tabs are molded integrally with said housing means.

22. A fan according to claim 21 wherein said tabs are disposed at an edge of said top surface joining said rear wall.

23. A fan according to claim 14 wherein said second retainer means comprises a handle.

24. A fan according to claim 23 wherein said handle is mounted for movement on said top surface in said given direction.

25. A fan according to claim 24 including bias means biasing movement of said handle toward said first retainer means.

26. A fan according to claim 25 wherein said first retainer means comprises a pair of tabs spaced apart in a direction transverse to said given direction.

27. A fan according to claim 26 wherein said tabs are molded integrally with said housing means.

28. A fan according to claim 27 wherein said tabs are disposed at an edge of said top surface joining said rear wall.

29. A fan according to claim 14 including third retainer means projecting upwardly from said top surface and spaced from said second retainer means in said given direction and wherein said second retainer means is disposed between said first retainer means and said third retainer means means is spaced therefrom.

30. A fan according to claim 29 wherein said second retainer means is mounted for movement on said top surface in said given direction.

* * * * *